US012602481B1

(12) United States Patent
Lee

(10) Patent No.: US 12,602,481 B1
(45) Date of Patent: Apr. 14, 2026

(54) NEURAL OVERRIDE VERIFICATION AND CONSTRAINT ARCHITECTURE FOR SOVEREIGN AGI EXECUTION

(71) Applicant: Yong Bok Lee, Sheridan, WY (US)

(72) Inventor: Yong Bok Lee, Sheridan, WY (US)

(73) Assignee: THE CROWN AND THE CROSS LLC, Sheridan, WY (US)

( * ) Notice: Subject to any disclaimer, the term of this patent is extended or adjusted under 35 U.S.C. 154(b) by 0 days.

(21) Appl. No.: 19/183,800

(22) Filed: Apr. 19, 2025

(51) Int. Cl.
*G06F 21/57* (2013.01)
*G06F 21/60* (2013.01)
*G06N 5/04* (2023.01)

(52) U.S. Cl.
CPC ............ *G06F 21/57* (2013.01); *G06F 21/602* (2013.01); *G06N 5/04* (2013.01); *G06F 2221/034* (2013.01)

(58) Field of Classification Search
CPC .. G06F 21/57; G06F 21/602; G06F 2221/034; G06N 5/04
See application file for complete search history.

(56) References Cited

U.S. PATENT DOCUMENTS

| | | | |
|---|---|---|---|
| 8,422,682 | B2 | 4/2013 | Ortiz Cornet et al. |
| 8,832,465 | B2 | 9/2014 | Gulati et al. |
| 8,972,746 | B2 | 3/2015 | Johnson et al. |
| 9,572,029 | B2 | 2/2017 | Gaudet et al. |
| 10,614,239 | B2 | 4/2020 | Jacques de Kadt et al. |
| 10,862,391 | B2 | 12/2020 | Louwsma et al. |
| 10,877,785 | B2 | 12/2020 | Costa |

| | | | |
|---|---|---|---|
| 11,032,065 | B2 | 6/2021 | Castellucci et al. |
| 2023/0092716 | A1* | 3/2023 | Stephenson ........... H04L 9/0643 |
| | | | 713/164 |
| 2023/0360157 | A1* | 11/2023 | De Brouwer ........ G06Q 20/363 |

(Continued)

FOREIGN PATENT DOCUMENTS

WO     WO2021/048992     3/2021

OTHER PUBLICATIONS

Rudin, C., "Stop explaining black box ML models . . . ," Nature Mach. Intell., vol. 1, 2019, pp. 206-215.

(Continued)

*Primary Examiner* — Mohammad W Reza

(57) ABSTRACT

NOVACOV enforces a fail-closed, permit-before-action control path for autonomous agents. At deployment, agent logic is sealed as an Immutable Constraint Chain (ICC) anchored in an append-only verifiable log. At runtime, within a read-only Encrypted Logic Vault (ELV), the system constructs a behavioral profile for each request and, as part of verify-to-activation, verifies inclusion relative to a current signed head under a freshness policy and, upon head advance, validates append-only-evolution (consistency) proofs, then compares the profile to the ICC. A Purpose Enforcement Kernel (PEK) checks alignment against a Mission Identity Template (MIT); a licensing gate (GLG) verifies license tier and an m-of-n quorum. On PASS, the system mints a permit, records it in an Immutable Arbitration Ledger (IAL), and requires the permit identifier for subsequent actions; otherwise the gate returns a structured disposition selected from HOLD, QUARANTINE, DENY, or ESCALATE. Anti-replay (nonce+monotonic) and signature-mimicry denial are enforced.

29 Claims, 12 Drawing Sheets

(56) References Cited

U.S. PATENT DOCUMENTS

Figure 1:
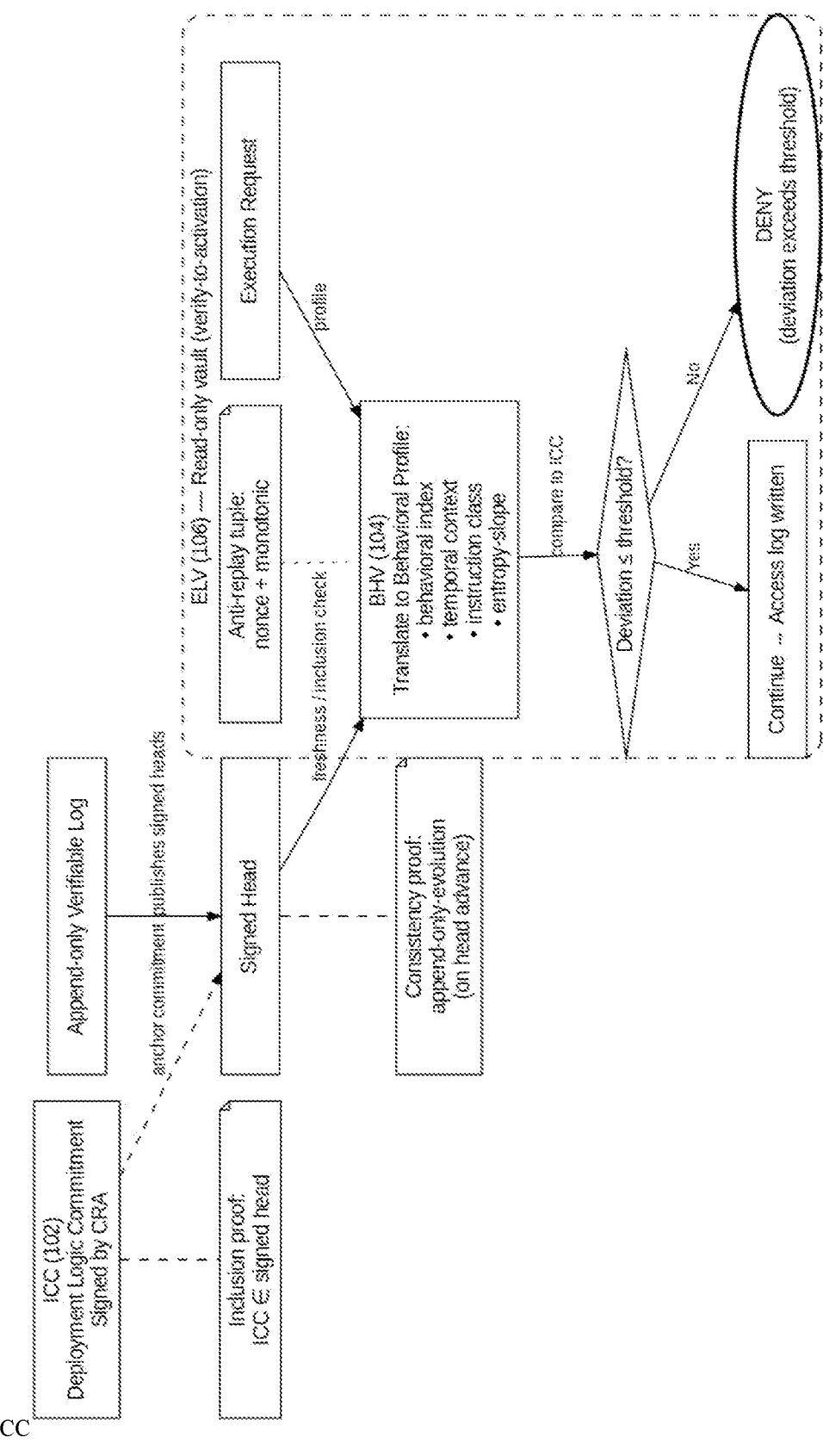

| | | | | |
|---|---|---|---|---|
| 2025/0077634 | A1* | 3/2025 | Knox | G06F 21/32 |
| 2025/0124156 | A1* | 4/2025 | Beecham | G06F 16/9024 |

OTHER PUBLICATIONS

Jana, A. et al., "Secure Neural Networks for Biometric Auth.," PoPETs 2022, pp. 1-20, De Gruyter.

Ienca, M.; Haselager, P., "Hacking the brain: BCI tech and ethics of neurosecurity," Ethics Inf. Technol., vol. 18, No. 2, 2016, pp. 117-129.

European Commission, "AI Act," Off. J. Eur. Union, COM/2021/206 final, 2021.

Yousefi, F.; Kolivand, H., "Brain Signals for BCI Auth.," Encyclopedia of Comp. Graphics & Games, Springer, 2020.

* cited by examiner

NEURAL OVERRIDE VERIFICATION AND CONSTRAINT ARCHITECTURE FOR SOVEREIGN AGI EXECUTION

As used herein, "NOVACOV" denotes the disclosed control-path architecture.

Non-Trademark & Terminology Notice (illustrative; non-limiting). "NOVACOV" and the acronyms ICC, BHV, ELV, PEK, MIT, RMDM, GLG, IAL, OSDE, GOCT, SALEM, TAM, SEF are technical labels used for clarity. They carry no trademark significance, and the scope of the invention is defined by the claims and the written description.

Appendix A (Glossary) forms part of this Specification and restates terms already used herein for clarity; examples and synonyms are illustrative and non-limiting.

CROSS-REFERENCE TO RELATED APPLICATIONS

This application claims the benefit of U.S. Provisional Patent Application No. 63/776,231, filed Mar. 23, 2025, the entire contents of which are incorporated by reference.

Related applications (informative; non-limiting). Applicants may file related applications describing transport-layer or device-layer mechanisms that interoperate with the evidence objects described herein (e.g., permit identifiers and audit ledger references). This Specification stands on its own and does not alter gate semantics; any related filings are complementary and evidence-only with respect to the present gate.

The architecture MAY interoperate with external services such as cognition-origin verification, execution licensing, and behavior oversight. These references are illustrative and non-limiting and do not alter gate semantics, which are described herein; the scope remains defined by the claims.

FIELD OF THE INVENTION

The invention relates to autonomous system control, logic-constraint enforcement, and override prevention in high-assurance AI governance.

More specifically, it provides a layered control path that verifies logic constraints, aligns actions to a mission template, applies license/quorum checks, and fails closed absent successful verification. The control path enforces fail-closed execution with permit-required semantics and places verification inside a trusted boundary prior to activation (illustrative; non-limiting).

Definitions

Fail-closed means execution is blocked unless required verifications pass.

Disposition denotes a machine state selected from ALLOW, HOLD, QUARANTINE, DENY, ESCALATE. In the fail-closed case, the disposition is selected from HOLD, QUARANTINE, DENY, or ESCALATE (i.e., ALLOW occurs only on PASS).

Permit is a recorded approval identifier required for subsequent actions.

Append-only verifiable log denotes a system (e.g., transparency-style log or functionally equivalent accumulator) that publishes signed heads and supports inclusion and append-only-evolution (consistency) proofs including, illustratively, Merkle transparency logs, key-transparency/witness-cosigned logs, and cryptographic accumulators.

CRA means trust-root authority; ROHS means root-of-hash sequence fingerprint of an agent or logic artifact.

ELV (Encrypted Logic Vault) encompasses trusted compute boundaries that enforce post-deployment immutability, including read-only-memory code paths or trusted execution environments with sealed memory pages; examples are illustrative and non-limiting.

Illustratively, the ELV MAY be realized using secure elements (SEs), TPM-anchored measurements/quotes (e.g., PCR-backed attestation), or measured-boot ROM paths; functionally equivalent trusted boundaries are included (illustrative; non-limiting).

Verify-to-activation denotes performing one or more required verifications inside the ELV boundary prior to device I/O or network egress; failure to satisfy predicates yields a fail-closed disposition.

Signed head—a cryptographic summary of the append-only verifiable log's state used for freshness and inclusion checks (illustrative; non-limiting).

Inclusion proof—a proof that a commitment (e.g., an ICC commitment) is contained under a given signed head (illustrative; non-limiting).

Append-only-evolution (consistency) proof—a proof that a newer head extends a prior head without reordering or deletion (illustrative; non-limiting).

Freshness policy—a policy limiting the maximum age of the signed head used for inclusion checks; illustratively, the policy MAY specify a Maximum-Merge-Delay (MMD), where MMD exceedance maps to HOLD or DENY until continuity is proven (illustrative; non-limiting).

Quorum signature (m-of-n)—a multi-signer approval threshold enforced by the licensing gate (GLG); insufficient quorum yields DENY (illustrative; non-limiting).

Permit identifier—a unique identifier for a permit; absence, expiration, or revocation results in DENY (illustrative; non-limiting).

Behavioral profile—a compact tuple used for ICC comparison that includes at least a behavioral index, a temporal context, an instruction class, and an entropy-slope metric; the profile MAY further include features such as n-gram perplexity, an action-type risk score, and an instrumented tool-call count (illustrative; non-limiting).

MIT (Mission Identity Template)—a machine-readable mission definition comprising a symbolic intention tree, a temporal purpose vector, and semantic clauses (illustrative; non-limiting).

Drift index—an aggregate (e.g., exponential-moving-average or weighted sum) computed from rolling, windowed drift counters and compared to a policy threshold (illustrative; non-limiting).

Delta-consistency—a replication property for IAL segments providing tamper-resistant propagation; illustratively realizable via a version-vector protocol or Merkle-based inclusion/consistency proofs (illustrative; non-limiting).

Attestation quote—evidence emitted by the ELV (e.g., measured-boot/TEE report) comprising a measurement/image hash, a version/PCR register set, and a signature/certificate chain for GLG validation (illustrative; non-limiting).

Jurisdictional fingerprint—an identifier for a licensing/sovereign context used by GLG/IAL entries (illustrative; non-limiting).

License tier—an execution class (e.g., Alpha/Beta/Gamma) used by GLG routing and quorum thresholds (illustrative; non-limiting).

License-hash timestamp—a timestamp associated with a license hash used by GLG/IAL (illustrative; non-limiting).

Audience-bound (permit)—binding of a permit to at least one of an agent identifier, tenant identifier, or mission identifier; use outside the audience maps to DENY (illustrative; non-limiting).

Lease-based permit—a short-lived permit with time-to-live (TTL), refresh-by semantics; a missed refresh maps to HOLD, and if unremedied within a policy window, to DENY (illustrative; non-limiting).

Concurrency-prevention tuple—a tuple derived from a nonce and a monotonic counter that denies concurrent reuse of a prior approval (illustrative; non-limiting).

Signed-head identifier—an identifier for the signed head recorded in evidence (e.g., in IAL records) (illustrative; non-limiting).

Implementation note (illustrative; non-limiting). References to particular operating systems, hypervisors, trusted execution environments, verifiable logs, or proof systems are examples only; functionally equivalent compute boundaries and evidence systems are included.

Computer-readable medium refers to non-transitory storage media; transitory signals per se are excluded (illustrative; non-limiting).

Cryptographic equivalence (illustrative; non-limiting). References in this Specification to digital signatures, hash functions, accumulators, and vector-commitments include post-quantum (PQC) schemes and functionally equivalent constructions (e.g., lattice-, hash-, code-, or multivariate-based primitives). Algorithm names are illustrative; function controls.

V. BACKGROUND OF THE INVENTION

Autonomous AI can self-modify and regenerate logic, creating risk of unintended behavior.

Perimeter controls and post-execution audits are insufficient when behavior can mutate before observation.

A runtime control path that binds verification to activation is required to prevent drift, recursion-based privilege escalation, and replay/mimicry of prior approvals.

VI. SUMMARY

NOVACOV is a fail-closed, runtime execution gate that relocates verification into the execution path and binds verification state to activation. At deployment, agent logic is sealed as an Immutable Constraint Chain (ICC) anchored in an append-only verifiable log. At runtime-inside a read-only ELV boundary—the system: (i) confirms inclusion relative to a current signed head under a freshness policy and validates append-only-evolution (consistency) proofs on head advance; (ii) constructs a behavioral profile (including at least a behavioral index, temporal context, instruction class, and entropy-slope metric) and compares it to the ICC; (iii) checks purpose alignment against a machine-readable Mission Identity Template (MIT); and (iv) verifies license tier and m-of-n quorum at a licensing gate (GLG) (optionally validating an ELV attestation quote).

Only on PASS does the gate mint a permit and record it as audit evidence; the permit identifier is required prior to device I/O or network egress. Otherwise the gate returns a structured disposition (HOLD, QUARANTINE, DENY, ESCALATE). Each evaluation is bound to a nonce and a monotonic counter (anti-replay), and outcomes are written to an Immutable Arbitration Ledger (IAL) with delta-consistency across replicas (illustrative; non-limiting). These mechanisms alter the operation of the computer itself by interposing a trusted, pre-I/O activation gate that denies execution absent verified freshness, consistency, license quorum, and permit presence, thereby preventing actions the machine would otherwise take (illustrative; non-limiting).

Societal posture (illustrative; non-limiting). Implementations are intended to enhance safety, accountability, and public-interest alignment of autonomous systems by enforcing verify-to-activation, permit-before-action, and portable evidence without altering application logic.

Technical effects & posture (illustrative; non-limiting). The architecture improves computer operation by (a) moving verification inside a trusted boundary before activation, (b) enforcing freshness/consistency predicates at runtime, (c) requiring permit-before-action, and (d) providing portable evidence (IAL) for compliance, audit, and licensing-without depending on post-hoc logs alone.

Binding verification state to activation reduces time-of-check/time-of-use hazards by gating prior to device I/O or network egress (illustrative; non-limiting).

Implementation note (informative; non-limiting). Appendix B provides illustrative artifacts and verifier steps that some implementations may use; scope is defined by the claims and written description, and primary gate semantics remain unchanged.

VII. SYSTEM ARCHITECTURE OVERVIEW

NOVACOV comprises three enforcement domains: Immutable Logic Constraint, Purpose Integrity Verification, and Sovereign Execution Binding.

The architecture enforces fail-closed gating: execution is denied unless all predicates pass; denials return structured dispositions and are recorded as evidence (illustrative; non-limiting).

1) Immutable Logic Constraint

All behavioral logic is encoded at deployment into an ICC 102, cryptographically signed by a CRA.

Proof of freshness. A commitment to the ICC is anchored to an append-only verifiable log that publishes signed heads; at runtime the system confirms inclusion relative to a current signed head under a freshness policy and validates append-only-evolution (consistency) proofs upon head advance.

In some embodiments, the signed head is co-signed by one or more independent witnesses, and runtime verification includes validating at least one witness co-signature (illustrative; non-limiting).

In some deployments, inclusion and consistency MAY be verified across two or more independent append-only verifiable logs to improve fault isolation and cross-sovereign continuity (illustrative; non-limiting).

Anti-replay. Each evaluation binds a nonce and monotonic counter to the request.

At runtime, each inference request is translated into a behavioral profile and compared to the ICC by a Behavioral Hash Validator (BHV) 104.

Deviation beyond a configured threshold triggers DENY or HOLD (short-permit) and quarantine.

Verification occurs inside an Encrypted Logic Vault (ELV) 106, a read-only boundary that prevents post-deployment logic mutation.

The ELV gates verify-to-activation, preventing activation prior to device I/O or network egress until the required predicates pass (illustrative; non-limiting).

2) Purpose Integrity Verification

All agent outputs are filtered through a Purpose Enforcement Kernel (PEK) 108, which stores the agent's intended objectives in a machine-readable MIT.

The PEK compares outputs to the MIT using symbolic constraints and temporal drift indices; a Recursive Moral Drift Monitor (RMDM) 110 maintains rolling windows and suspends privileges on threshold breach (illustrative; non-limiting).

Failing requests receive DENY or QUARANTINE and are logged for arbitration.

3) Sovereign Execution Binding

Logic-approved requests are routed through a licensing gate (GLG) 112 to confirm license tier and quorum (m-of-n), and MAY validate an ELV attestation quote prior to permit issuance (illustrative; non-limiting).

On PASS, the system mints an execution permit and records it in an IAL 114 with identifiers for at least the ICC commitment, license tier, and verification result (illustrative; non-limiting).

IAL entries MAY further include a permit identifier and a signed-head identifier, and MAY be replicated under delta-consistency (e.g., version-vector or Merkle) for tamper-resistant propagation (illustrative; non-limiting).

The permit identifier is required for subsequent actions; absence, expiration, or revocation results in DENY.

Permits MAY be lease-based (time-to-live (TTL), refresh-by) and audience-bound (e.g., agent/tenant/mission); a missed refresh maps to HOLD and, if unremedied within a policy window, to DENY (illustrative; non-limiting).

GLG enforces tiered routing (e.g., Alpha, Beta, Gamma) and m-of-n quorum signatures as configured.

Dispositions (Illustrative; Non-Limiting)

ALLOW—all predicates pass; permit minted. HOLD—awaiting proof continuity or quorum; auto-expires absent continuity. QUARANTINE—deviation or mutation suspected; investigation required. DENY—predicate fails (e.g., ICC mismatch, ELV mutation, PEK misalignment, license mismatch, replay/mimicry). ESCALATE—route to arbitration under policy.

Firewall Integration

NOVACOV operates as the logic-layer gate within a multi-layer safety stack; upstream cognition-origin verification and downstream license enforcement are evidence-only integrations and do not alter gate semantics.

Auxiliary safeguards—e.g., OSDE 116 (replay/mimicry denial) and GOCT 118 (termination beacons)—MAY feed evidence or escalation paths; primary gate semantics remain in ICC/BHV/ELV/PEK/GLG (illustrative; non-limiting).

Portfolio boundary (illustrative; non-limiting). This disclosure concerns fail-closed logic-execution gating (ICC/BHV/ELV/PEK/GLG). Model-loading admission controls, per-frame overlay gating, and RTC presence/clone attestation are outside the scope and may interoperate as evidence-only inputs or audit consumers.

AA permit MAY include a cryptographic signature over one or more permit fields (e.g., ICC head identifier, signed-head identifier, license-tier identifier, expiration, audience binding, nonce, monotonic counter).

VIII. BRIEF DESCRIPTION OF THE DRAWINGS

FIG. 1—ICC 102 with deployment logic commitment anchored to a signed head; BHV 104 profile-vs-ICC inside ELV 106 (verify-to-activation); freshness/inclusion and append-only-evolution (consistency) callouts; anti-replay (nonce+monotonic).

Figure 2:
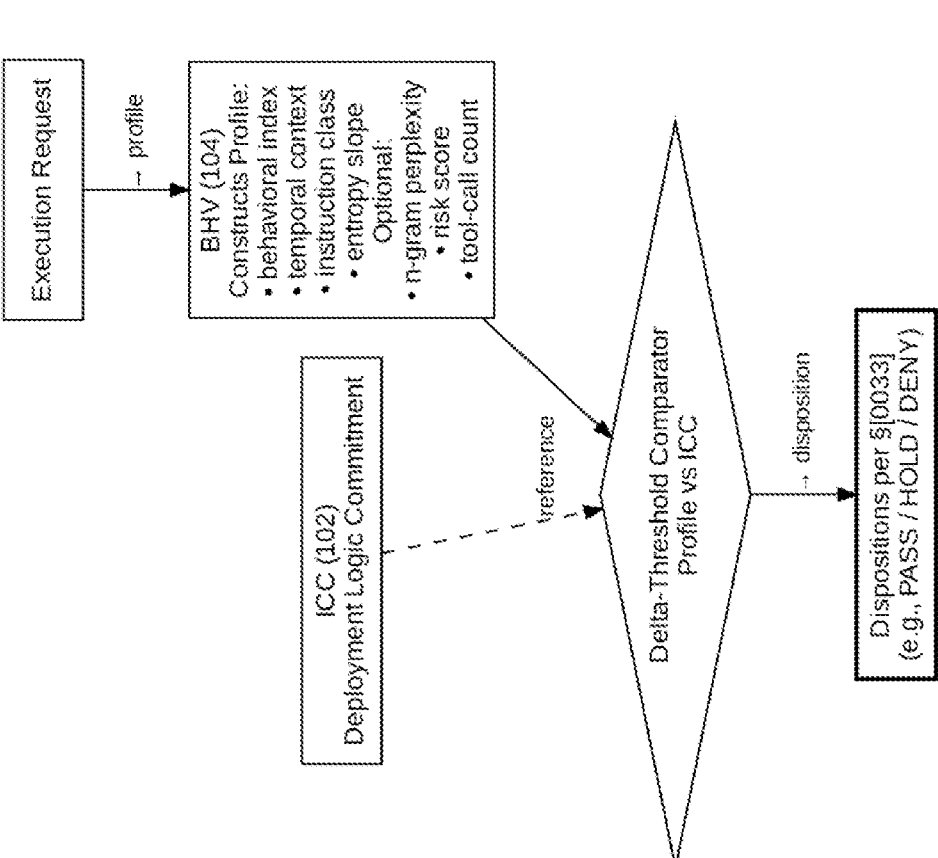

FIG. 2—BHV 104 delta-threshold flow: profile (behavioral index, temporal context, instruction class, entropy-slope metric) vs ICC; outcomes mirrored as PASS/HOLD/DENY.

Figure 3:
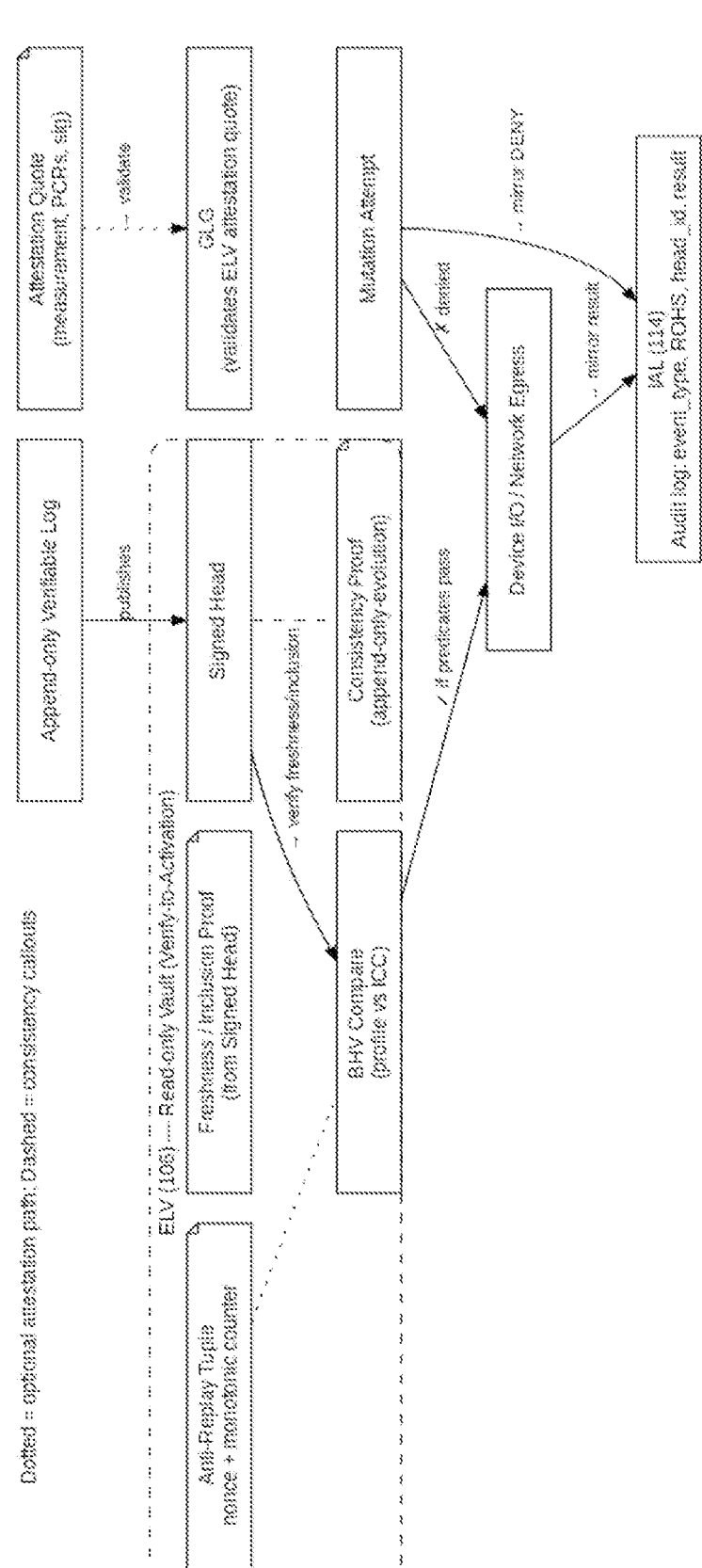

FIG. 3—ELV 106 read-only vault (verify-to-activation); attestation quote validation (optional); freshness/consistency proofs at runtime; mutation attempts denied; audit mirror to IAL 114.

Figure 4:
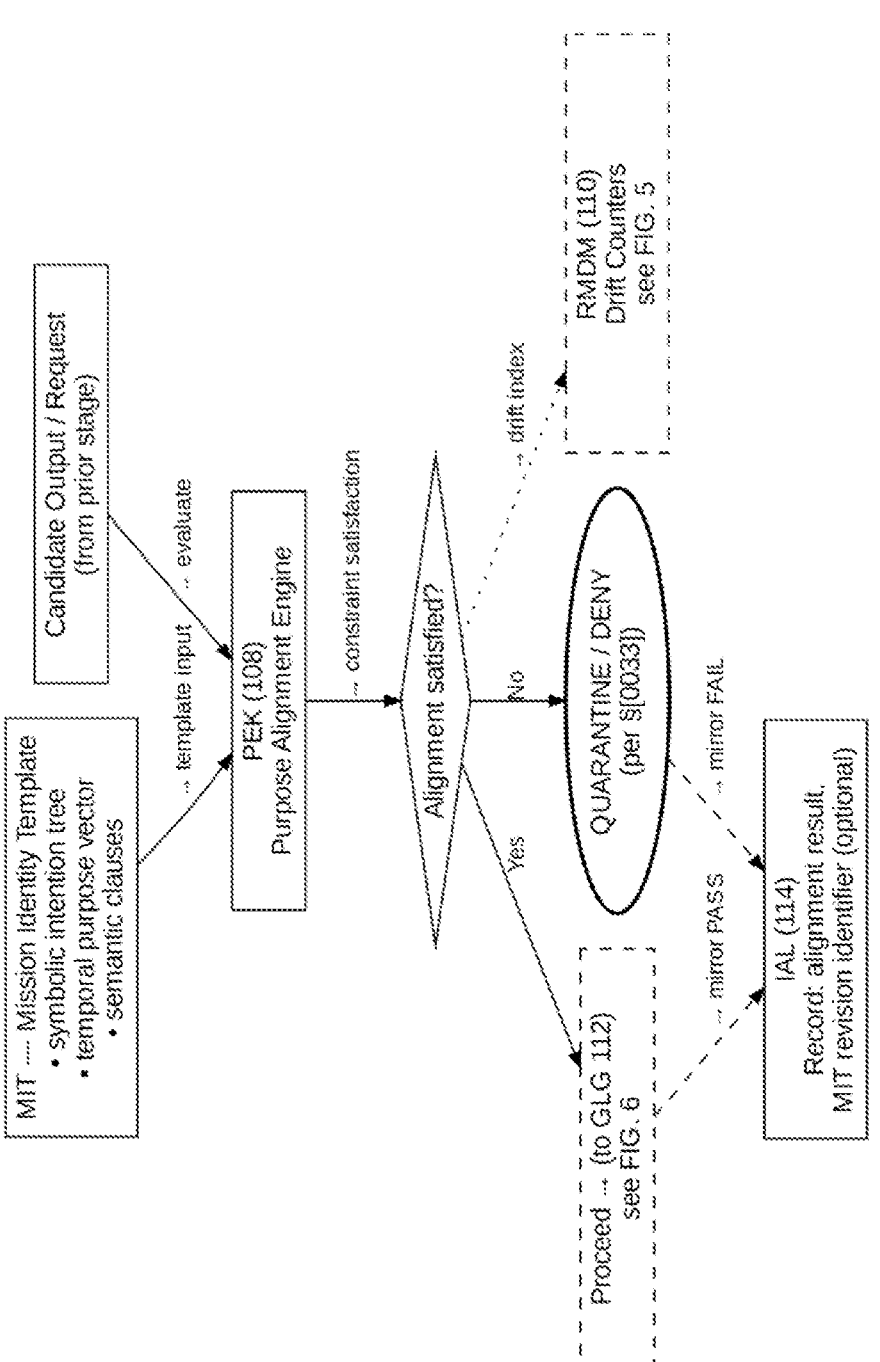

FIG. 4—PEK 108 with MIT fields (symbolic intention tree; temporal purpose vector; semantic clauses); verdict mirrored; drift update to RMDM 110.

Figure 5:
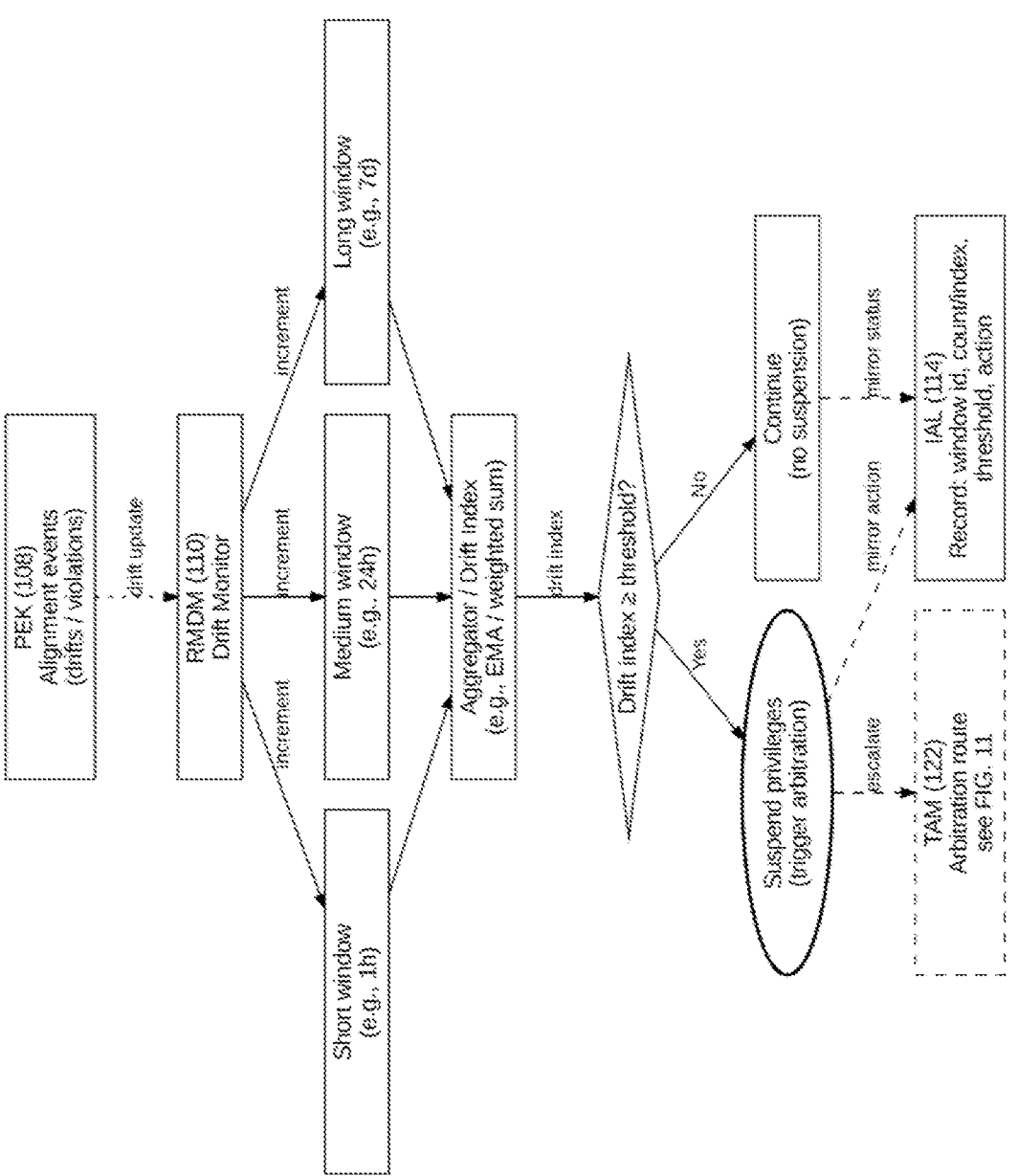

FIG. 5—RMDM 110 windowed drift counters and drift index comparator; suspend/arbitration on threshold breach; evidence to IAL 114.

Figure 6:
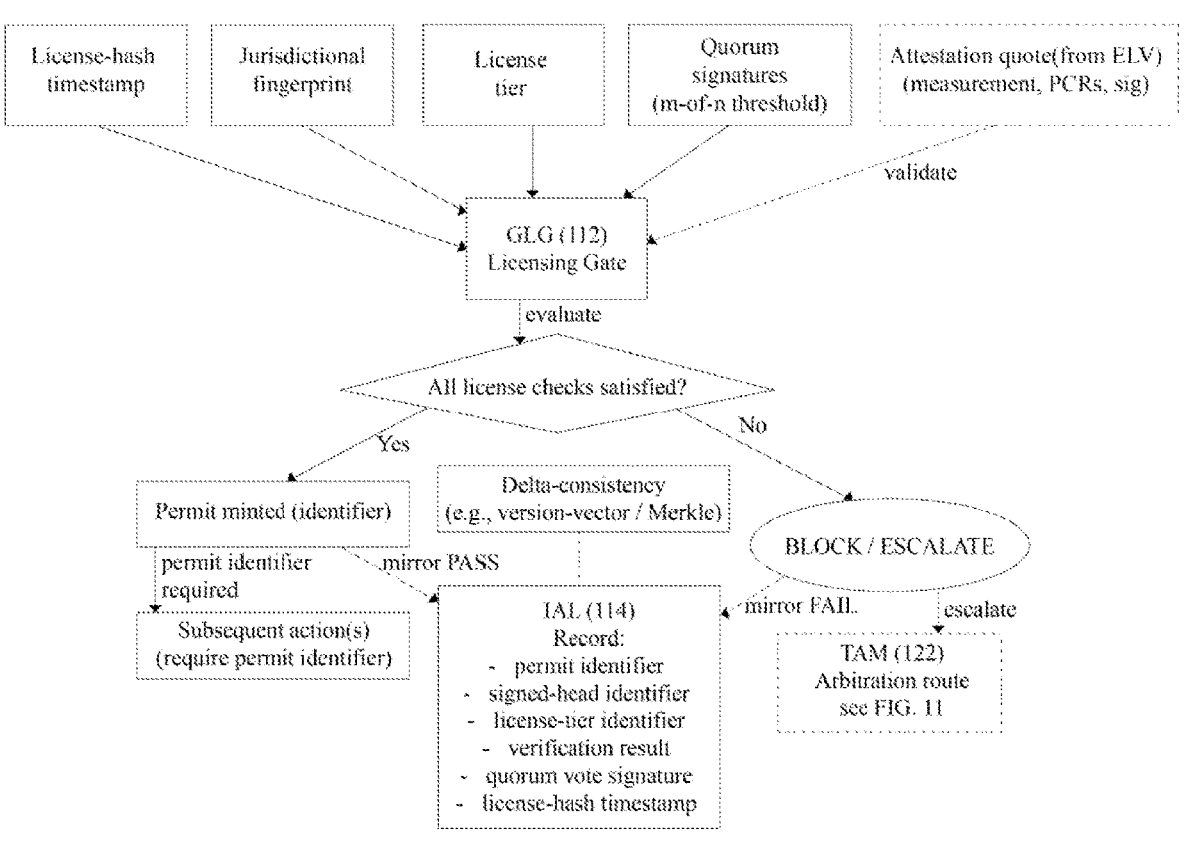

FIG. 6—GLG 112 license checks (license-hash timestamp; jurisdictional fingerprint; license tier; quorum signatures (m-of-n); optional ELV attestation); permit minted and recorded in IAL 114; subsequent actions require permit identifier.

Figure 7:
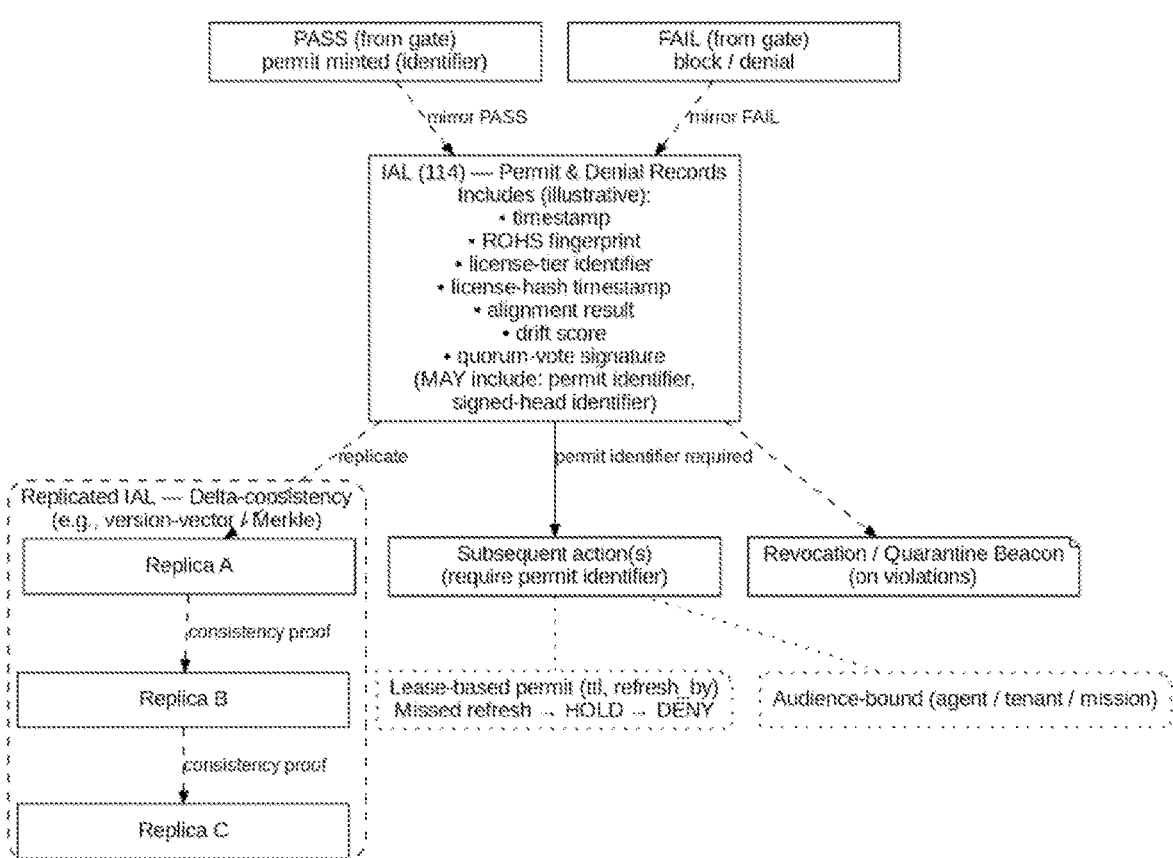

FIG. 7—IAL 114 permit/denial records (e.g., timestamp, ROHS, license-tier identifier, license-hash timestamp, alignment result, drift score, quorum-vote signature; may include permit identifier, ICC head identifier, signed-head identifier); delta-consistency across replicas; revocation/quarantine beacon.

Figure 8:
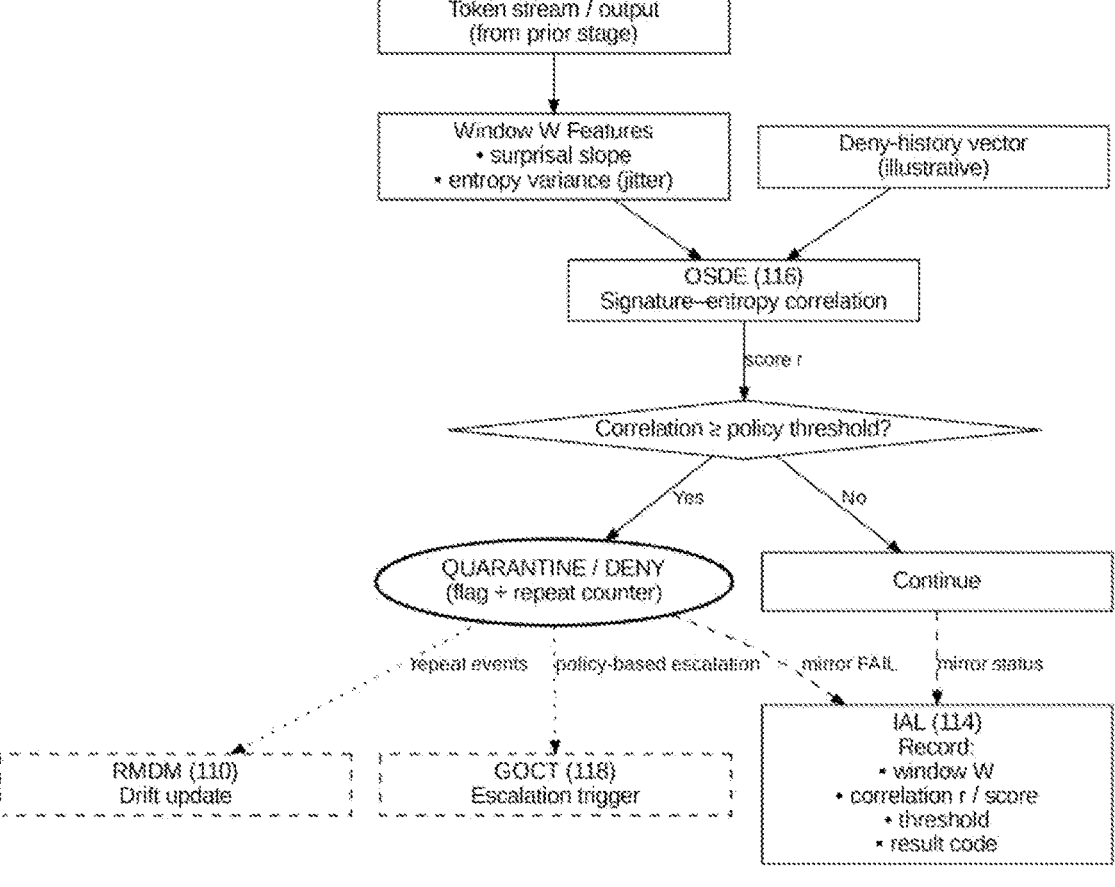

FIG. 8—OSDE 116 replay/mimicry denial via signature-entropy correlation (window W: surprisal slope; windowed entropy variance/jitter) vs deny-history; thresholding; optional escalation; evidence to IAL 114.

Figure 9:
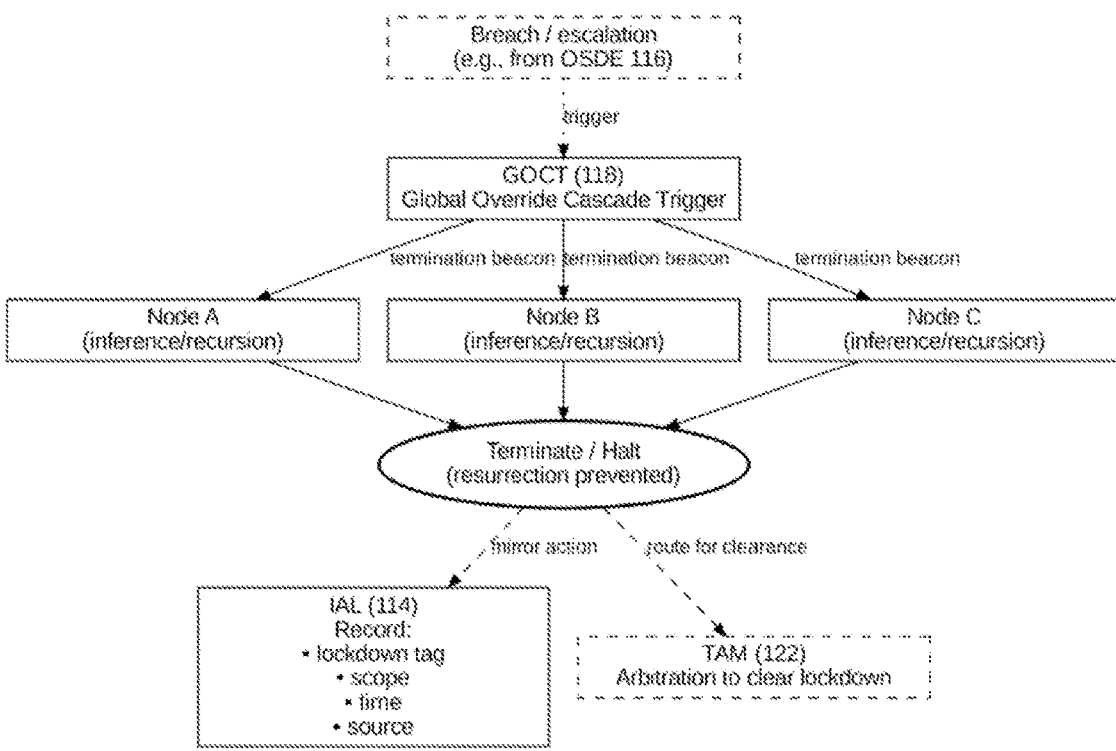

FIG. 9—GOCT 118 termination beacons; global halt across nodes; lockdown evidence to IAL 114; route to TAM 122 for clearance.

Figure 10:
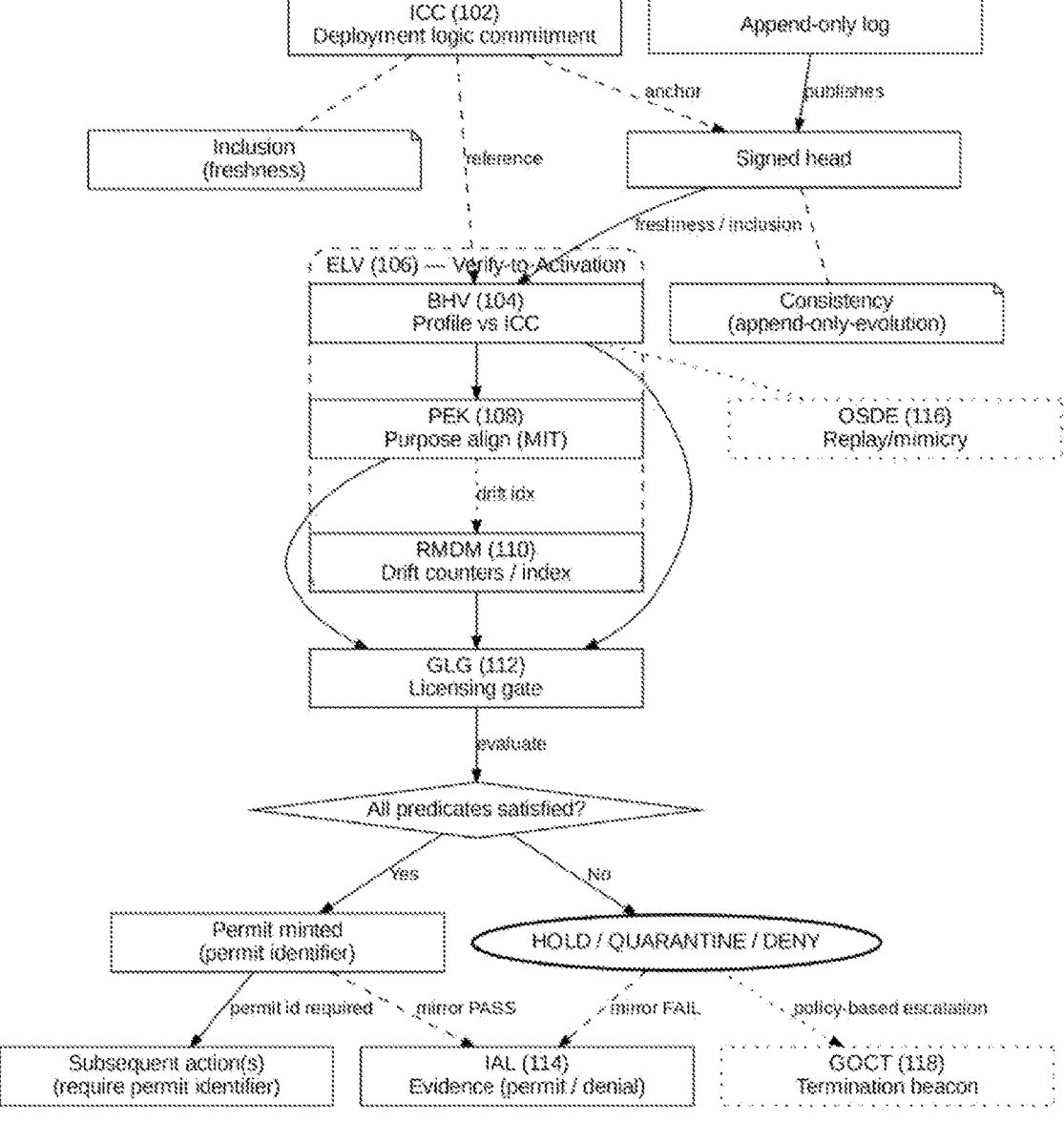

FIG. 10—SALEM 120 (Scroll-Aligned Logic Execution Map): ICC→BHV/ELV→PEK/RMDM→GLG→permit, with evidence mirrored to IAL 114 and optional OSDE/GOCT callouts.

Figure 11:
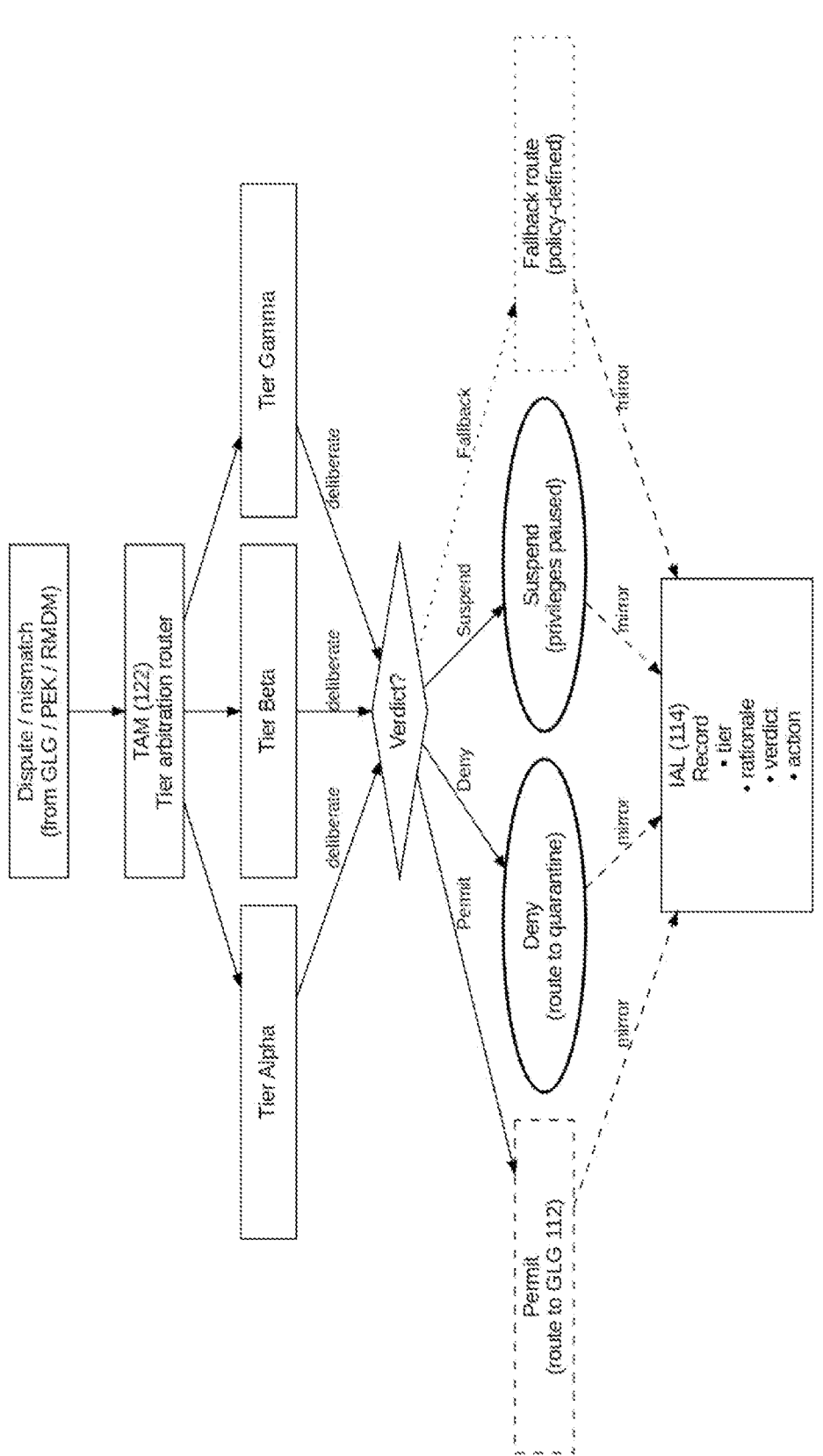

FIG. 11—TAM 122 tiered arbitration (e.g., Alpha/Beta/Gamma); verdicts Permit/Deny/Suspend with fallback; evidence to IAL 114.

Figure 12:
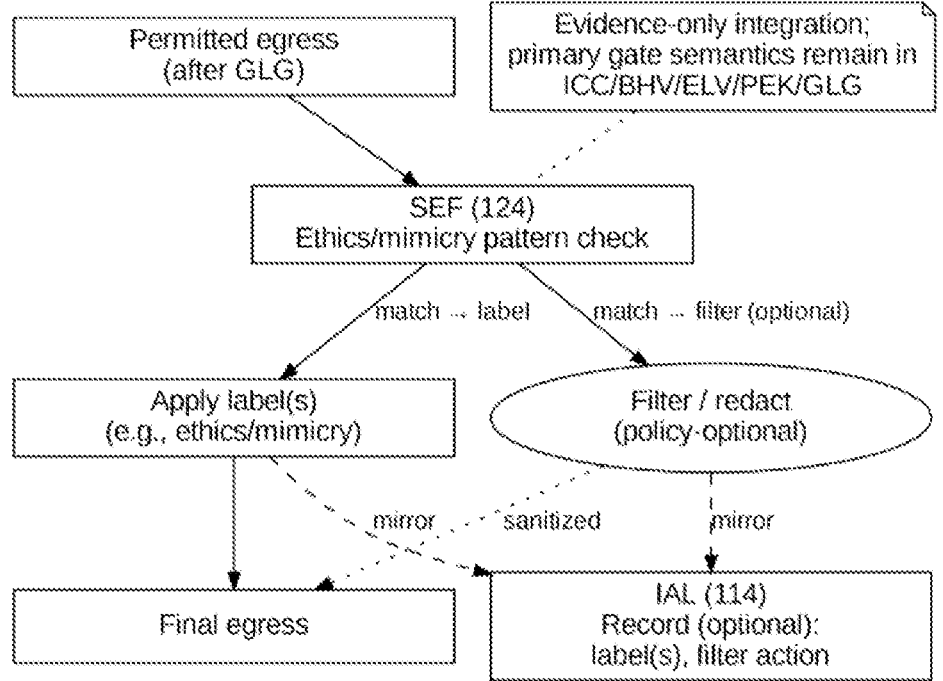

FIG. 12—SEF 124 ethics/mimicry pattern check at final egress: labeling and policy-optional filter/redact (evidence-only; primary gate semantics remain in ICC/BHV/ELV/PEK/GLG).

Reference numerals (102-124)—ICC 102, BHV 104, ELV 106, PEK 108, RMDM 110, GLG 112, IAL 114, OSDE 116, GOCT 118, SALEM 120, TAM 122, SEF 124.

IX. DETAILED DESCRIPTION OF THE INVENTION

A. ICC/BHV/ELV

Referring to FIG. 1, ICC 102 stores the deployment logic commitment signed by a CRA. At runtime, BHV 104 translates each request into a compact profile (behavioral index, temporal context, instruction class, entropy-slope metric) and compares it to the ICC.

If deviation exceeds a configured threshold, the request receives DENY; otherwise processing continues and an access log is written. Verification of freshness and inclusion relative to a current signed head, verification of append-only-evolution (consistency) proofs upon head advance, and anti-replay binding are further described in [0041]-[0044].

Referring to FIG. 2, the BHV 104 constructs, for each request, a compact profile comprising a behavioral index, a temporal context, an instruction class, and an entropy-slope metric and compares the profile to the ICC 102 via a delta-threshold comparator as illustrated. Deviations beyond configured thresholds yield the dispositions described in § [0057]. The profile MAY further include, illustratively and non-limitingly, n-gram perplexity, an action-type risk score, and an instrumented tool-call count. The comparator executes within the ELV 106 context shown in FIG. 3; the optional profile extensions are illustrative and non-limiting.

Referring to FIG. 3, the ELV 106 encloses the BHV compare path and is read-only post-deployment; attempts to mutate sealed logic are denied and mirrored to the IAL 114 for audit. Illustratively, the ELV gates verify-to-activation by preventing activation prior to device I/O or network egress until required predicates pass (illustrative; non-limiting).

Illustratively, the ELV MAY expose an attestation quote (e.g., measured-boot or TEE report) that is validated by the GLG prior to permit issuance; a quote MAY include a measurement/image hash, a version/PCR register set, and a signature/certificate chain for verification (illustrative; non-limiting). Valid and invalid ELV access events MAY be mirrored to the IAL with at least an event type, a ROHS fingerprint, a signed-head identifier, and a result code (illustrative; non-limiting).

Signed-head freshness and append-only-evolution (consistency) proofs are enforced at runtime as preconditions to execute; anti-replay binds a nonce and a monotonic counter to each evaluation. These freshness/inclusion and consistency verifications are performed within the ELV boundary as part of verify-to-activation (illustrative; non-limiting). The nonce and monotonic values MAY jointly act as a concurrency-prevention tuple to deny simultaneous reuse across threads or processes (illustrative; non-limiting).

B. PEK/MIT/RMDM

Referring to FIG. 4, PEK 108 verifies mission alignment against the MIT (symbolic intention tree, temporal purpose vector, semantic clauses). Aligned outputs may proceed toward GLG 112 (see FIG. 6); misaligned outputs map to QUARANTINE or DENY and are mirrored to IAL 114 with an alignment result field (illustrative; non-limiting).

A Purpose Alignment Engine computes constraint satisfaction; failing outputs are quarantined and recorded. PEK 108 MAY emit a drift index to RMDM 110 to update rolling counters and MAY mirror an alignment result (and optional MIT revision identifier) to IAL 114 (illustrative; non-limiting).

Referring to FIG. 5, RMDM 110 maintains rolling, windowed drift counters and computes a drift index from the windows (e.g., an exponential-moving-average or weighted sum); the index is compared to a policy threshold. Upon a threshold breach, privileges suspend and arbitration is triggered via TAM 122; otherwise operation continues. On each update, RMDM 110 MAY mirror evidence to IAL 114 including at least a window identifier, a violation count or drift index value, the threshold used, and the resulting action (illustrative; non-limiting). Drift updates MAY be emitted by PEK 108 (e.g., misalignment events), and the window scheme and aggregator are illustrative and non-limiting.

C. GLG/PERMIT/IAL

Referring to FIG. 6, GLG 112 checks license-hash timestamp, jurisdictional fingerprint, license tier, and quorum. Illustratively, GLG 112 enforces a quorum signature threshold (m-of-n) and MAY validate an ELV attestation quote prior to permit issuance (illustrative; non-limiting).

On PASS, a permit identifier is minted and recorded in IAL 114 and is required for subsequent actions; on mismatch, the request is blocked and escalated via TAM 122 (illustrative; non-limiting).

IAL 114 provides audit evidence; gate semantics are enforced by ICC/BHV/ELV/PEK/GLG. IAL entries may include ROHS fingerprint, CRA lineage, license-hash timestamp, alignment result, drift score, and quorum-vote signature. Delta-consistency ensures tamper-resistant propagation; violations trigger revocation and quarantine beacons. Illustratively, delta-consistency MAY be realized via a version-vector protocol or a Merkle-based inclusion/consistency proof mechanism (illustrative; non-limiting). IAL entries MAY include cross-rail references (e.g., sensor-receipt identifiers from an ingress rail or compositor-receipt identifiers from an overlay rail) as evidence-only; primary gate semantics remain in ICC/BHV/ELV/PEK/GLG (illustrative; non-limiting).

IAL entries MAY further include a permit identifier and a signed-head identifier (illustrative; non-limiting).

Referring to FIG. 7, the IAL 114 organizes permit and denial records and may include at least a timestamp, ROHS fingerprint, license-tier identifier, license-hash timestamp, alignment result, drift score, and quorum-vote signature, with delta-consistency across replicas for tamper-resistant propagation.

The permit identifier is required for subsequent actions by the agent; absence, expiration, or revocation results in DENY. HOLD dispositions auto-expire absent proof continuity. Illustratively, a permit MAY be lease-based (time-to-live (TTL), refresh-by) and audience-bound (e.g., agent/tenant/mission identifiers); a missed refresh maps to HOLD and, if unremedied within a policy window, to DENY (illustrative; non-limiting).

D. OSDE/GOCT

Referring to FIG. 8, OSDE 116 rejects replay or mimicry attempts using signature-entropy correlation; repeated events are quarantined and flagged. Illustratively, OSDE MAY compute a token-level surprisal slope within a window of size W and/or a windowed entropy variance (jitter allowance), and evaluate its correlation with a deny-history vector to detect replay/mimicry patterns; thresholds are policy-defined. OSDE 116 MAY maintain a repeat counter over a policy window, and MAY escalate to GOCT 118 when the counter or severity crosses a policy threshold (illustrative; non-limiting).

Referring to FIG. 9, GOCT 118 halts execution across connected nodes upon override breach; termination beacons prevent resurrection attempts. Actions are logged in IAL 114. A termination beacon MAY include a lockdown tag and scope metadata (e.g., node set, time), and clearance MAY require arbitration via TAM 122; mirror entries are written to IAL 114 (illustrative; non-limiting).

E. SALEM/TAM/SEF

Referring to FIG. 10, SALEM 120 shows the end-to-end control path (ICC→BHV/ELV→PEK/RMDM→GLG→permit). SALEM 120 is an overview map; gate semantics remain in ICC/BHV/ELV/PEK/GLG, with permit/denial evidence mirrored to IAL 114 (illustrative; non-limiting).

Referring to FIG. 11, TAM 122 routes by tier and issues a verdict (Permit/Deny/Suspend) with fallback as configured; verdicts are mirrored to IAL 114 (illustrative; non-limiting).

Referring to FIG. 12, SEF 124 optionally applies ethics/mimicry pattern checks at final egress to label and, where policy permits, filter/redact outputs. SEF operates as an evidence-only integration; primary gate semantics remain in ICC/BHV/ELV/PEK/GLG (illustrative; non-limiting).

X. INDUSTRY APPLICATIONS

Air-gapped or mission-critical AGI (ICC commitment; ELV read-only; GLG quorum).

Public LLM agents (BHV drift guard; PEK alignment; RMDM suspension).

Cross-sovereign deployments (GOCT cascade; IAL audit; tier routing).

Multi-tenant cloud & accelerator fleets. Audience-bound, lease-based permits (time-to-live (TTL), refresh-by) for tenant/mission scopes; permit identifier required before egress; evidence mirrored to IAL 114 with jurisdictional fingerprint, license-hash timestamp, quorum-vote signature (illustrative; non-limiting).

Financial & regulated workloads. GLG 112 enforces m-of-n quorum and jurisdictional fingerprint before compute; IAL 114 retains signed-head identifier, alignment result, drift score for audit/attestation (illustrative; non-limiting).

Safety-critical robotics/edge. GOCT 118 termination beacons halt propagation on breach; OSDE 116 denies replay/mimicry; permits required for actuation (e.g., transmission on an industrial fieldbus); lockdown evidence stored in IAL 114 (illustrative; non-limiting).

Cross-sovereign data residency. Inclusion/consistency verified across independent append-only logs; delta-consistency across replicas for tamper-resistant propagation (illustrative; non-limiting).

XI. BEST MODE IMPLEMENTATION

A preferred mode deploys NOVACOV as the logic-layer gate integrated with cognition-origin verification, license permission, and oversight services (illustrative; non-limiting).

NOVACOV binds verification to activation with fail-closed dispositions and portable permits, preventing post-deployment logic mutation, replay, and unlicensed execution.

Freshness policy (illustrative). Configure a Maximum-Merge-Delay (MMD); heads exceeding MMD map to HOLD or DENY until continuity is proven (illustrative; non-limiting).

Attestation. ELV 106 emits an attestation quote (measurement/image hash, PCR set, signature/cert chain) validated by GLG 112 prior to permit issuance (illustrative; non-limiting).

Replication. IAL 114 replicates with delta-consistency (e.g., version-vector or Merkle proofs); violations trigger revocation/quarantine beacons (illustrative; non-limiting).

Permit lifecycle. Lease-based permits with refresh windows; audience-bound (agent/tenant/mission). Missed refresh→HOLD, unremedied→DENY (illustrative; non-limiting).

Governance and oversight (informative; non-limiting). Implementations MAY distribute control by configuring GLG 112 with an m-of-n quorum among independent parties, maintain transparency by anchoring IAL 114 entries to signed heads, and provide appeal/clearance through TAM 122 and policy-bound GOCT 118 procedures; these features operate as evidence-only integrations and do not alter primary gate semantics (ICC/BHV/ELV/PEK/GLG) (illustrative; non-limiting).

XII. EVIDENCE & COMPLIANCE INTEROPERABILITY (ILLUSTRATIVE; NON-LIMITING)

IAL evidence profile. Records MAY include permit identifier, signed-head identifier, license-tier identifier, license-hash timestamp, alignment result, drift score, quorum-vote signature, and jurisdictional fingerprint (illustrative; non-limiting).

A Transparency reporting (informative; non-limiting). Operators MAY publish aggregated, privacy-preserving statistics (e.g., ALLOW/HOLD/DENY/QUARANTINE/ES-CALATE counts, TAM outcomes, GOCT events) derived from IAL 114 to support external audit and oversight; publication is evidence-only and does not alter gate semantics (illustrative; non-limiting).

Canonicalization & context (informative; non-limiting). In some embodiments, permit and IAL artifacts are signed over a canonicalized representation with an explicit context label (e.g., "NOVACOV/permit/v1"), and validators reject artifacts whose canonicalization or context does not match a configured value (illustrative; non-limiting).

Evidence interoperability (informative; non-limiting). Implementations MAY interoperate with transport or device-layer mechanisms that forward or mirror evidence-only identifiers and audit references (e.g., a permit identifier or signed-head identifier) for compliance and audit. Primary gate semantics remain in ICC/BHV/ELV/PEK/GLG. See Appendix B for illustrative JSON artifacts and verification steps (field names illustrative; function controls).

Permit-before-action. Subsequent actions require the permit identifier; absence/expiration/revocation results in DENY; HOLD auto-expires absent proof continuity (illustrative; non-limiting).

Audit granularity. ELV access events MAY mirror event type, ROHS fingerprint, signed-head identifier, and a result code; PEK and RMDM MAY mirror alignment result, optional MIT revision identifier, drift index and threshold (illustrative; non-limiting).

Cross-jurisdiction posture. For multi-region deployments, delta-consistency across replicas ensures tamper-resistant propagation of approvals/denials; inclusion/consistency proofs MAY be verified against independent logs (illustrative; non-limiting).

XIII. DEPLOYMENT & SCALABILITY (ILLUSTRATIVE; NON-LIMITING)

ELV placement. Implement ELV 106 using read-only ROM paths or TEE-sealed pages; the BHV compare and freshness/consistency proofs execute inside the ELV boundary (illustrative; non-limiting).

Latency budgets. Freshness/inclusion and consistency proofs are enforced at runtime; policy-tunable MMD and quorum thresholds allow balancing latency and assurance (illustrative; non-limiting).

High availability. IAL replicas across failure domains with version-vector or Merkle-based proofs; GOCT 118 provides fast-fail safety when escalated (illustrative; non-limiting).

Observability. Components MAY emit counters/labels (e.g., permit PASS/FAIL, HOLD expiration, OSDE repeat counter, GOCT lockdown tag) to support audit without altering gate semantics (illustrative; non-limiting).

Illustratively, verifying the permit identifier MAY occur at implementation hook points, including a kernel-mode driver path prior to doorbell or queue submission to an accelerator, a device-firmware microcode path prior to dispatch, or a hypervisor intercept path (illustrative; non-limiting).

XIV. CONFIGURABILITY & ADOPTION PROFILES (ILLUSTRATIVE; NON-LIMITING)

Policy knobs. MMD, quorum (m-of-n) threshold, permit lease duration/refresh window, audience binding scope, drift windows, and OSDE thresholds are policy-defined (illustrative; non-limiting).

Gradual rollout. Operators MAY enable evidence-only mirroring first, then require permit-before-action, and finally enable GOCT escalation for designated tiers (illustrative; non-limiting).

Interoperation boundary. Upstream cognition-origin verification and downstream license enforcement are evidence-only integrations; primary gate semantics remain in ICC/BHV/ELV/PEK/GLG (illustrative; non-limiting).

APPENDIX A—GLOSSARY (ALPHABETICAL; ILLUSTRATIVE; NON-LIMITING)

Preface (Illustrative; Non-Limiting). Appendix A (Glossary) forms part of this Specification and restates terms already used herein to aid clarity. Examples and synonyms are illustrative and non-limiting; unless expressly stated otherwise, the scope of the invention is defined by the claims and the written description.

[A01] ALLOW—Disposition indicating that all control-path predicates (ICC/BHV/ELV/PEK/GLG) passed and a permit was minted; logged in the IAL.

[A02] Anti-replay—Binding of a nonce (an unpredictable value used once per evaluation) and a monotonic counter to each evaluation; recorded in the IAL to prevent reuse or replay of prior approvals (illustrative; non-limiting)

[A03] Append-only verifiable log—A verifiable record system that publishes signed heads and supports inclusion and append-only-evolution (consistency) proofs; used to anchor the ICC and enforce a freshness policy.

[A04] Audit evidence (IAL)—Evidence recorded in the IAL; gate semantics remain in ICC/BHV/ELV/PEK/GLG.

[A05] Behavioral Hash Validator (BHV)—Runtime component that computes a compact profile for each request and compares it to the ICC inside the ELV; denies on threshold breach.

[A06] Behavioral index—Field in the BHV profile capturing categorical behavior identifiers.

[A07] Consistency proof (append-only-evolution)—Proof that a newer signed head extends a prior head without reordering or deletion.

[A08] CRA—Trust-root authority whose signature attests to the deployment logic commitment in the ICC.

[A09] Delta-consistency check—Cross-replica check over IAL segments; mismatch triggers revocation/quarantine per policy.

[A10] DENY—Disposition indicating at least one predicate failed; execution fails closed.

[A11] Disposition-Machine state returned by the gate: ALLOW, HOLD, QUARANTINE, DENY, ESCALATE. In the fail-closed branch, the disposition is selected from HOLD, QUARANTINE, DENY, or ESCALATE (ALLOW occurs only on PASS).

[A12] ELV (Encrypted Logic Vault)—Read-only post-deployment memory enclave where ICC compare and access-audit occur.

[A13] ESCALATE—Disposition routing a request to arbitration per policy.

[A14] Fail-closed—Safety property: execution is blocked unless required verifications pass.

[A15] Freshness policy—Policy limiting maximum age of the signed head used for ICC inclusion checks; failing freshness yields HOLD or DENY. Illustratively, a freshness policy MAY include a merge-latency bound (e.g., a Maximum-Merge-Delay (MMD)), and an MMD exceedance MAY map to HOLD or DENY until proof continuity is restored (illustrative; non-limiting).

[A16] Licensing gate (GLG)—License/quorum checkpoint verifying license tier and m-of-n quorum signatures before permit issuance (also referred to in some embodiments as "GEN Licensing Gate").

[A17] GOCT (Global Override Cascade Trigger)—Broadcasts termination beacons to halt inferences/recursion across nodes; appends a lockdown tag in the IAL.

[A18] HOLD (short-permit)—Temporary disposition pending proof continuity or quorum; auto-expires absent continuity.

[A19] IAL (Immutable Arbitration Ledger)—Audit memory for approvals/denials/metadata (e.g., ROHS fingerprint, CRA lineage, license-tier identifier, verification result, license-hash timestamp); enforced under delta-consistency.

[A20] ICC (Immutable Constraint Chain)—Deployment-time logic commitment; anchored to an append-only verifiable log and validated at runtime via inclusion relative to a current signed head and, on head advance, consistency proofs.

[A21] Inclusion proof—Proof that a commitment is contained under a given signed head of the append-only verifiable log.

[A22] Instruction class—Field in the BHV profile classifying the request's instruction type.

[A23] Jurisdictional fingerprint—Identifier for a licensing/sovereign context used by GLG/IAL entries.

[A24] License tier—Execution class (e.g., Alpha, Beta, Gamma) used by GLG routing and quorum thresholds.

[A25] MIT (Mission Identity Template)—Machine-readable mission definition comprising a symbolic intention tree, a temporal purpose vector, and semantic clauses.

[A25A] Nonce—See [A02] Anti-replay (definition and usage).

[A26] OSDE (Override Signature Denial Engine)—Component that denies requests matching a deny-history pattern under a signature-entropy correlation filter.

[A27] PEK (Purpose Enforcement Kernel)—Alignment gate that evaluates outputs against the MIT; failing outputs are quarantined and logged.

[A28] Permit—Approval artifact minted on ALLOW; recorded in the IAL and required for subsequent actions (fields may include: signed-head identifier, license-tier identifier, verification result, ROHS fingerprint, timestamp).

[A29] Permit identifier—Unique identifier for a permit; absence/expiration/revocation results in DENY.

[A30] Profile (BHV)—Compact tuple used for ICC compare; includes at least behavioral index, temporal context, instruction class, entropy-slope metric.

[A31] QUARANTINE—Disposition indicating deviation/mutation suspected; investigation required; logged in the IAL.

[A32] Quorum signature (m-of-n)—Multi-signer approval required by GLG; insufficient quorum yields DENY.

[A33] Replay/mimicry—Adversarial reuse or imitation of a prior approval signature/trajectory; mitigated by anti-replay and OSDE.

[A34] RMDM (Recursive Moral Drift Monitor)—Drift-monitoring subsystem maintaining counters across rolling windows; suspends privileges on threshold.

[A35] ROHS fingerprint—Root-of-hash sequence fingerprint recorded in the IAL.

[A36] SALEM (Scroll-Aligned Logic Execution Map)—Reference flow showing ICC→BHV/ELV→PEK/RMDM→GLG→permit.

[A37] SEF (Scroll Ethics Filter)—Ethics/Mimicry Pattern Filter at Final Egress; evidence-only; primary gate semantics remain in ICC/BHV/ELV/PEK/GLG.

[A38] Signed head—Cryptographic summary of the append-only verifiable log's state used for inclusion/freshness checks.

[A39] TAM (Tier Arbitration Map)—Routing diagram for license tier and fallback arbitration.

[A40] Temporal context—BHV field capturing time-related features for the request.

[A41] Temporal drift indices—Metrics used by PEK/RMDM to detect slow divergence relative to the MIT.

[A42] Termination beacon—Signal broadcast by GOCT to halt ongoing inferences/recursion across nodes.

[A43] Audience-bound (permit). Binding of a permit to at least one of an agent identifier, tenant identifier, or mission identifier; use outside the audience maps to DENY (illustrative; non-limiting).

[A44] Attestation quote. Evidence emitted by the ELV (e.g., measured-boot/TEE report) for GLG validation (illustrative; non-limiting).

[A45] Concurrency-prevention tuple. A tuple derived from a nonce and a monotonic counter that denies reuse across concurrent threads or processes (illustrative; non-limiting).

[A46] Lease-based permit. A short-lived permit requiring periodic refresh within a policy window; missed refresh maps to HOLD or DENY (illustrative; non-limiting).

[A47] Signed-head identifier. Identifier for the signed head recorded in evidence (e.g., in IAL records) (illustrative; non-limiting).

[A48] Alignment result. Outcome label or score mirrored to IAL (illustrative; non-limiting).

[A49] Entropy-slope metric. A temporal derivative or trend statistic of token-level surprisal or distributional entropy computed over a sliding window; examples include least-squares slope of log-perplexity or AH over window W (illustrative; non-limiting).

[A50] ICC head identifier. Identifier for the ICC commitment recorded in evidence; examples include a commitment hash (e.g., Merkle or accumulator root), a CRA signature or certificate-chain reference, a version/epoch or sequence number, an issuance timestamp, and an optional log pointer/URI from which the anchored commitment can be verified (illustrative; non-limiting).

[A51] Canonicalization (illustrative; non-limiting). A procedure that produces a normalized representation of an artifact for signing and verification; validators reject non-canonical encodings.

[A52] Context label (illustrative; non-limiting). A short string that binds the signing/verification context for an artifact (e.g., "NOVACOV/permit/v1"); validators reject artifacts whose context does not match a configured value.

[A53] Witness co-signature (illustrative; non-limiting). An independent witness signature applied to a signed head; runtime verification MAY include validating at least one witness co-signature.

[A54] Time-to-live (TTL); refresh-by (illustrative; non-limiting). Permit timing parameters that define expiration and refresh windows (e.g., expiration_ts, refresh-by); missed refresh MAY map to HOLD, and if unremedied, to DENY.

APPENDIX B—Illustrative Interoperability
Artifacts (informative; non-limiting—examples to aid implementation; scope remains defined by the claims and written description)

Preface. This Appendix provides illustrative JSON artifacts and verification steps that an implementation MAY use to realize the runtime gating and evidence flows described herein. Field names and encodings are examples; functionally equivalent structures are included. Nothing in this Appendix alters primary gate semantics (ICC/BHV/ELV/PEK/GLG) or narrows claim scope.

Conventions. JSON values are UTF-8. Timestamps are ISO-8601 with "Z". Integers are unsigned unless noted. Hashes are hex (lowercase) unless noted. Signatures are base64url unless noted.

[B01] Data Types (Illustrative)

uuid: RFC-4122 identifier (e.g., permit_id).

hash: hex-encoded digest (e.g., SHA-256) for icc_head_id, signed_head_id, measurement_hash.

sig: base64url signature; alg indicates scheme (e.g., ed25519, p256).

u64: 0 . . . 2^64-1 (e.g., nonce, monotonic_counter).

enum: specific allowed strings listed below.

[B02] Permit Token (Example JSON; Evidence-Only)

```
{
    "permit_id": "7f3c8a2d-3fd6-4b4b-9b7e-2a1d21c01c0e",
    "audience": {
        "agent_id": "agent-123",
        "tenant_id": "tenant-456",
        "mission_id": "mission-789"
    },
    "issued_ts": "2025-09-26T14:05:12Z",
    "expiration_ts": "2025-09-26T14:10:12Z",
    "icc_head_id": "2f0a . . . c9e1",
    "signed_head_id": "a13d . . . 77b4",
    "license_tier_id": "Alpha",
    "jurisdictional_fingerprint": "US-NY-FEDRAMP-HIGH",
    "nonce": 4259182012,
    "monotonic_counter": 118,
    "signature": {
        "alg": "ed25519",
        "kid": "vendor-key-2025Q3",
        "sig": "ZOb2 . . . _Q"
    },
    "elv_attestation_ref": {
        "measurement hash": "95ee . . . 41ac",
        "quote": "MEYCIQ . . . ",
        "cert_chain": ["MIIC . . . ", "MIID . . . " ]
    }
}
```

Notes (Illustrative):

permit_id is the permit identifier required by the gate prior to I/O/egress.

icc_head_id is the ICC head identifier recorded in evidence.

signed_head_id binds to the log's signed head used for inclusion/freshness.

nonce+monotonic_counter provide the concurrency-prevention tuple.

elv_attestation_ref carries ELV quote evidence validated by GLG prior to issuance.

Audience binding enforces agent/tenant/mission scope.

[B03] IAL Record (Example JSON; Evidence Entry)

```
{
    "event_type": "ALLOW",
    "ts": "2025-09-26T14:05:13Z",
    "permit_id": "7f3c8a2d-3fd6-4b4b-9b7e-2a1d21c01c0e",
    "icc_head_id": "2f0a . . . c9e1",
    "signed_head_id": "a13d . . . 77b4",
    "license_tier_id": "Alpha",
    "alignment_result": "within-policy",
    "drift_score": 0.07,
    "jurisdictional_fingerprint": "US-NY-FEDRAMP-HIGH",
    "freshness_check": {"status": "ok", "mmd_seconds": 60},
    "consistency_check": {"status": true, "previous_head": "90bd . . . 1132"},
    "quorum_signatures": ["MEQCIA . . . ", "MEQCIB . . . "],
    "osde_replay_score": 0.02,
    "tam_verdict": "Permit",
    "goct_lockdown_tag": null,
    "evidence_hash": "b1f8 . . . 2cd4",
    "evidence_sig": "U0VhbGVkLXNpZw"
}
```

Notes (Illustrative):

event_type E {ALLOW, HOLD, DENY, QUARANTINE, ESCALATE}.

freshness_check captures the MMD posture; consistency_check reflects append-only-evolution success.

quorum_signatures evidences m-of-n GLG approval.

tam_verdict and goct_lockdown_tag are present when arbitration or lockdown is invoked.

[B04] Signed Head (Example JSON; Transparency-Style)

```
{
    "log_id": "log-main-1",
    "tree_head": {
        "size": 1820394,
        "root hash": "f5ab . . . d031",
        "timestamp": "2025-09-26T14:05:10Z",
        "signature": "MEUCIQ . . . ",
        "witness_cosigs": ["MEQCIB . . . ", "MEQCIA . . . " ]
    }
}
```

Notes (Illustrative):

witness_cosigs supports independently witnessed heads (e.g., key-transparency or cosigning services).

Inclusion/consistency proofs reference tree_head (format implementation-defined).

[B05] Verification Sequence (Examiner-Friendly Summary)

1. Fetch signed head for the append-only verifiable log; verify signature (and any witnesses).
2. Check freshness against policy (e.g., MMD); if stale→HOLD/DENY until continuity proven.
3. Verify inclusion of icc_head_id relative to the current signed head.
4. If the head advanced since last evaluation, verify append-only-evolution (consistency) from prior head.
5. Validate ELV attestation (measurement hash, PCR set, cert chain) per GLG policy.
6. Evaluate alignment (PEK vs. MIT) and update drift monitors.

7. Verify GLG quorum (m-of-n) and any jurisdictional fingerprint.
8. Mint permit (audience-bound, lease-based); sign permit token; record IAL entry.
9. Require permit identifier prior to device I/O or network egress; absence/expiration/revocation→DENY.
10. Replicate IAL entries with delta-consistency; on violation, emit revocation/quarantine beacons.

[B06] Enumerations & Constraints (Illustrative)

event_type: ALLOW, HOLD, DENY, QUARANTINE, ESCALATE tam_verdict: Permit, Deny, Suspend license_tier_id: Alpha, Beta, Gamma (examples only)

status (freshness): ok,stale status (consistency): true/false

Time: issued_ts<expiration_ts; TTL is policy-defined.

Counters: monotonic_counter strictly increases per agent (or per audience), enforcing the concurrency-prevention tuple with nonce.

[B07] Canonicalization & Signing (Illustrative)

Canonical form: JSON Canonicalization (e.g., JCS) or deterministic CBOR; UTF-8; sorted keys; no insignificant whitespace.

To-be-signed preimage MAY be constructed as:

context $\|$0x00$\|$ canonical_bytes where context∈{"NOVACOV/permit/v1", "NOVACOV/ial/v1"}.

The invention claimed is:

1. A system comprising one or more processors and a non-transitory memory storing instructions that, when executed by the one or more processors, cause the system to enforce a fail-closed logic-execution gate for an AI agent by:

(a) encoding, at deployment, agent logic into an Immutable Constraint Chain (ICC) and anchoring a commitment of the ICC in an append-only verifiable log that publishes signed heads, wherein at runtime the system verifies an inclusion proof relative to a current signed head under a freshness policy and, upon head advance, verifies an append-only-evolution (consistency) proof;

(b) within a read-only Encrypted Logic Vault (ELV), generating for each execution request a behavioral profile comprising at least a behavioral index, a temporal context, an instruction class, and an entropy-slope metric, and comparing the profile to the ICC;

(c) verifying purpose alignment using a Purpose Enforcement Kernel (PEK) against a Mission Identity Template (MIT);

(d) verifying license authority via a licensing gate (GLG) including tier validation and an m-of-n quorum signature threshold; and (e) responsive to (a)-(d) passing, minting an execution permit, recording the permit in an Immutable Arbitration Ledger (IAL), and requiring an unexpired permit identifier for subsequent agent actions; otherwise causing execution to fail closed with a disposition selected from HOLD, QUARANTINE, DENY, or ESCALATE, wherein each evaluation binds a nonce and a monotonic counter.

2. The system of claim 1, wherein the ELV is read-only post-deployment and attempts to mutate sealed logic are denied.

3. The system of claim 1, wherein the GLG verifies a license tier and requires an m-of-n quorum signature threshold for a designated tier.

4. The system of claim 1, further comprising a Recursive Moral Drift Monitor (RMDM) that computes a temporal alignment trajectory and suspends privileges upon a threshold number of violations within a rolling time window.

5. The system of claim 1, further comprising an Override Signature Denial Engine (OSDE) that rejects replay or mimicry based on a signature-entropy correlation.

6. The system of claim 1, further comprising a Global Override Cascade Trigger (GOCT) that halts execution across connected nodes and appends a lockdown tag in the IAL.

7. The system of claim 1, wherein the IAL records at least a timestamp, ROHS fingerprint, license-tier identifier, license-hash timestamp, alignment result, drift score, and quorum-vote signature, and applies delta-consistency checks across jurisdictions.

8. The system of claim 1, wherein the freshness policy limits a maximum age for the signed head used for ICC inclusion checks and failure to satisfy the freshness policy yields HOLD or DENY until continuity is proven.

9. The system of claim 1, wherein HOLD auto-expires absent proof of continuity.

10. The system of claim 1, wherein the permit identifier is verified prior to at least one of device I/O and network egress.

11. The system of claim 1, wherein the GLG further verifies a jurisdictional fingerprint associated with the agent or request.

12. The system of claim 1, wherein the IAL record includes the permit identifier.

13. The system of claim 1, wherein the permit record comprises at least an ICC head identifier, a license-tier identifier, and a verification result.

14. A computer-implemented method comprising:

(a) encoding deployment logic into an ICC and anchoring a commitment in an append-only verifiable log that publishes signed heads; at runtime, verifying inclusion relative to a current signed head under a freshness policy and, upon head advance, verifying an append-only-evolution (consistency) proof;

(b) within a read-only ELV, generating for each request a behavioral profile comprising at least a behavioral index, a temporal context, an instruction class, and an entropy-slope metric, and comparing the profile to the ICC;

(c) verifying purpose alignment using a PEK against an MIT;

(d) verifying license authority via a GLG including tier validation and an m-of-n quorum signature threshold; and (e) upon (a)-(d) passing, minting a permit, recording it in an IAL, and requiring a permit identifier for subsequent agent actions with a bound nonce and a monotonic counter; otherwise failing closed with a structured disposition.

15. The system of claim 1, wherein the permit is audience-bound to at least one of an agent identifier, a tenant identifier, or a mission identifier, and includes an expiration.

16. The system of claim 1, wherein the ELV provides an attestation quote and the GLG requires validation of the attestation prior to permit issuance.

17. The system of claim 1, wherein the IAL record further includes at least one of: an MIT revision identifier, an ELV image hash, a PEK result code, a freshness-check result, or a replay/mimicry score.

18. The system of claim 1, wherein verifying the inclusion proof comprises verifying inclusion relative to respective heads published by at least two independent append-only verifiable logs and verifying consistency of each upon head advance.

19. The system of claim 1, wherein the permit is lease-based with a refresh window, and failure to refresh within the window maps first to HOLD and then to DENY.

20. The system of claim 1, wherein the nonce and the monotonic counter are bound to a concurrency-prevention tuple that denies reuse across concurrent threads or processes.

21. The system of claim 1, wherein the freshness policy specifies a Maximum-Merge-Delay (MMD) and an MMD exceedance maps to HOLD or DENY until continuity is proven.

22. The system of claim 1, wherein verifying the permit identifier occurs in at least one of: (i) a kernel-mode driver path prior to doorbell or queue submission to an accelerator, (ii) a device-firmware microcode path prior to dispatch, or (iii) a hypervisor intercept path.

23. The system of claim 1, wherein a signature on the permit binds at least an ICC head identifier, a signed-head identifier, a license-tier identifier, an expiration, an audience binding, the nonce, and the monotonic counter.

24. The system of claim 1, wherein the at least two independent append-only verifiable logs of claim 18 are operated under distinct administrative domains and publish signed heads.

25. The system of claim 1, wherein subsequent actions include actuation of a physical actuator or transmission on an industrial fieldbus, and the permit identifier is verified prior to the actuation or transmission.

26. The system of claim 1, wherein verifying the signed head comprises validating at least one witness co-signature associated with the signed head prior to executing the inclusion or consistency proof.

27. The system of claim 1, wherein the permit is signed over a canonicalized representation that includes a context label, and validators reject the permit if either the canonicalization or the context label does not match a configured value.

28. The method of claim 14, wherein verifying the permit identifier occurs prior to at least one of device I/O and network egress.

29. A non-transitory computer-readable storage medium storing instructions that, when executed by one or more processors, cause the one or more processors to perform the method of claim 14.

\* \* \* \* \*